United States Patent [19]

Munday et al.

[11] Patent Number: 5,368,741
[45] Date of Patent: Nov. 29, 1994

[54] TREATMENT OF AQUEOUS PHOSPHORUS WASTES

[75] Inventors: Theodore F. Munday, Kendall Park, N.J.; Jay R. Brummer, Pocatello, Id.; Paul J. Beck, Yardley, Pa.

[73] Assignee: FMC Corporation, Philadelphia, Pa.

[21] Appl. No.: 134,954

[22] Filed: Oct. 12, 1993

[51] Int. Cl.$^5$ .............................................. C02F 1/62
[52] U.S. Cl. .................................... 210/724; 210/906; 210/912; 423/299; 423/304; 423/317
[58] Field of Search .............. 210/724, 906, 907, 912, 210/723; 423/299, 204, 317

[56] References Cited

U.S. PATENT DOCUMENTS

| | | | |
|---|---|---|---|
| 2,977,192 | 3/1961 | Cummins | 23/107 |
| 3,116,109 | 12/1963 | Cummins | 423/299 |
| 3,650,686 | 3/1972 | Hudson et al. | 210/906 |
| 3,971,707 | 7/1976 | Deshpande | 210/906 |
| 4,017,388 | 4/1977 | Albertson | 210/906 |
| 4,175,111 | 11/1979 | Munday et al. | 423/210 |
| 4,185,079 | 1/1980 | Munday et al. | 423/210 |
| 4,207,300 | 6/1980 | Kestner et al. | 423/299 |
| 4,258,022 | 3/1981 | Elsner et al. | 423/299 |
| 4,284,515 | 8/1981 | Liu | 210/724 |
| 4,329,224 | 5/1982 | Kim | 210/709 |
| 4,383,847 | 5/1983 | Barber | 210/906 |
| 4,402,833 | 9/1983 | Bennett et al. | 210/667 |
| 4,434,060 | 2/1984 | Altmansberger et al. | 210/724 |
| 4,671,882 | 6/1987 | Douglas et al. | 210/720 |
| 4,689,154 | 8/1987 | Zimberg | 210/906 |
| 4,737,356 | 4/1988 | O'Hara et al. | 423/659 |
| 4,950,409 | 8/1990 | Stanforth | 210/751 |
| 5,037,479 | 8/1991 | Stanforth | 106/691 |

FOREIGN PATENT DOCUMENTS

| | | |
|---|---|---|
| 700418 | 12/1964 | Canada . |
| 137799 | 9/1979 | Germany . |
| 224792 | 9/1988 | Japan . |
| 990918 | 5/1965 | United Kingdom . |

*Primary Examiner*—Neil McCarthy
*Attorney, Agent, or Firm*—Robert D. Jackson; Frank Ianno

[57] ABSTRACT

Aqueous phosphorus wastes from the electric furnace production of phosphors and containing heavy metal bearing particulates are treated with lime whereby the phosphorus is converted into useful phosphorus compounds and the heavy metals rendered sufficiently non-leachable to permit their release into the environment. The treatment is conducted above about 60° C. at a pH of between about 11.0 to 12.5.

7 Claims, No Drawings

TREATMENT OF AQUEOUS PHOSPHORUS WASTES

BACKGROUND OF THE INVENTION

This invention relates to a process for converting aqueous phosphorus wastes into leach resistant residues with provision for recovering phosphorus as high purity phosphorus compounds.

Elemental phosphorus is produced commercially by the reduction of phosphate ore in an electric furnace. In this process, the phosphate bearing ore, a carbon reductant usually coke, and a flux usually silica are charged into an electric furnace and the charge materials heated to melting temperatures. Elemental phosphorus, resulting from reduction of the phosphate by the carbon reductant, is expelled from the molten reaction mass as a vapor along with carbon monoxide plus small amounts of other gases. Ferrophos and slag are molten by-products of the reduction which are removed by tapping the furnace.

As the gaseous stream leaves the furnace, it entrains particles of carbon, phosphate ore and silica as well as other materials that may be present in the furnace. Some of these particulates are removed from the stream by passing it through a device for separating solids from a gas such as an electrostatic precipitator.

The solids-depleted stream is then led into a spray tower where the phosphorus vapor is condensed to liquid phosphorus by the cooling spray units in the tower. Liquid phosphorus is collected in the sump at the bottom of the tower where the flammable product, which is spontaneously ignitable in air, is stored under water to protect it from atmospheric exposure.

The phosphorus is pumped from the sump or a storage vessel into rail tank cars for shipment and delivery.

A commercial electric furnace phosphorus plant generates a number of aqueous waste products containing water, phosphorus and particles of entrained furnace material. The phosphorus occurs mainly as droplets suspended in the aqueous medium; very little is found dissolved since its water solubility is only 3.3 milligrams per liter.

Aqueous phosphorus wastes originate at various stages in the operation of the phosphorus plant.

For example, an aqueous phosphorus waste in the form of a slurry results when entrained furnace particles in admixture with phosphorus are removed from the electrostatic precipitator and quenched in water. The phosphorus content of the aqueous slurry generally ranges from about 0.1% to about 1.0%, typically about 0.5%; entrained particulate material from about 5% to about 20%, typically about 10%.

Another aqueous waste product associated with the operation of a phosphorus plant is created when phosphorus is recovered from phosphorus sludge. Phosphorus sludge consists of an intimate blend of phosphorus, water and entrained furnace particulates not trapped by the electrostatic precipitator. It is found in the spray tower sump and as a residue in storage tanks and railway cars.

Phosphorus is separated from the sludge by filtration or centrifugation and then combined with the plant phosphorus output or burned to make phosphorus pentoxide for conversion to phosphoric acid. The aqueous waste stream from the phosphorus recovery usually contains from about 0.1% to about 3% phosphorus, typically about 0.2 to about 0.6%.

In general, the herein aqueous phosphorus wastes are formed wherever phosphorus made by the electric furnace process and water come into contact. These phosphorus wastes, or phossy water as they are commonly referred to, vary in phosphorus assay from a few ppm to several percent.

In the disposal of aqueous phosphorus wastes from an electric phosphorus furnace, it has been the practice to place them in lined storage ponds. The solids settle to the bottom and are covered with soil to prevent spontaneous ignition of the phosphorus. Clarified water is recovered for use in the phosphorus plant.

Phosphorus and heavy metals in the entrained furnace solids are toxic substances thereby posing the risk of environmental contamination when aqueous phosphorus wastes are buried. Even plastic lined evaporation ponds can become leaky from aging or damage allowing the contents to seep into the soil.

Accordingly, phosphorus producers are phasing out retention ponds and directing their efforts to developing environmentally compatible techniques for disposing and handling such aqueous phosphorus wastes.

Although the percent of phosphorus lost to landfills or storage ponds is only a small amount of a plant's total output, it is not inconsequential, and may amount to thousands of pounds over the years. A process for recovering waste phosphorus would not only prevent environmental contamination but would increase plant output.

It is known to reduce phosphorus contaminated aqueous wastes by treating them with lime at a pH of about 9 to 10 whereby the phosphorus is converted to insoluble calcium phosphates which are recovered by settling and filtration. After contact with activated carbon to remove residual particles of insoluble phosphate, the filtrate can be discharged with no reported adverse environmental effects; see U.S. Pat. No. 4,402,833 to Bennett et al. A similar approach is proposed in U.S. Pat. No. 4,284,515 to Liu.

According to the aforecited patents, the processes disclosed therein are effective for eliminating phosphorus from aqueous waste streams in which the level of elemental phosphorus is of the order of 10 ppm or less. Nothing is said about dealing with high level aqueous phosphorus wastes.

It is also known to reduce the heavy metal content of wastes to below toxic concentrations. For instance, U.S. Pat. No. 4,950,409 to Stanforth discloses reacting solid wastes containing cadmium with a combination of lime and carbon dioxide. The cadmium is lowered from 0.5 to 3.2 ppm in the feed material to a non-leachable level of <1 ppm. In U.S. Pat. No. 4,671,882 to Deere, an aqueous waste containing 40 ppm of cadmium is treated sequentially with a phosphate at low pH, a coagulant and a calcium compound to raise the pH above 7.0, and then dewatered. In U.S. Pat. No. 4,737,356 to Wheelabrator, fly ash is mixed with a soluble phosphate and lime to reduce the cadmium concentration below 1 ppm. U.S. Pat. No. 5,037,479 to RMT discloses treating solid waste having a cadmium assay of 0.06 to 13 ppm with magnesium oxide plus triple superphosphate whereby the cadmium is rendered non-leachable. In U.S. Pat. No. 4,434,060 to GE, cadmium in aqueous wastes is insolubilized by treatment with lime.

It is to be noted that in these processes, the heavy metal wastes and phosphorus wastes are treated in separate operations. Whether the processes would be effective in dealing with aqueous wastes containing both phosphorus and heavy metal contaminants is a matter of conjecture.

It is to be further noted that the cadmium and phosphorus content of the aqueous wastes treated in the prior art processes are quite low—less than about 10 ppm of phosphorus and 40 ppm of cadmium.

By way of contrast, aqueous phosphorus wastes generated in a phosphorus plant commonly contain up to several percent of free phosphorus plus a high heavy metal content, with cadmium assays often exceeding 1% (10,000 ppm). Apparently such high level wastes would need to be greatly diluted before being amenable to treatment by the prior art processes.

With the imminent banning by governmental regulatory agencies of storage ponds for containment of aqueous wastes associated with phosphorus manufacture, there is created an urgent need to develop environmentally safe means for handling and disposing of these toxic materials.

OBJECTS AND SUMMARY OF THE INVENTION

It is, therefore, an object of the present invention to provide a method of treating aqueous phosphorus-wastes having both high levels of elemental phosphorus and heavy metal containing particles whereby the wastes are transformed into non-leachable solids. It is a further object of the invention to provide such method wherein about up to one third of the elemental phosphorus is recovered as high purity phosphorus compounds. Other objects and purposes will become apparent in the ensuing description.

In accordance with the invention, there is provided an environmentally compatible process for the disposal of phosphorus wastes generated in the electric furnace manufacture of elemental phosphorus, the wastes being an aqueous mixture of phosphorus and heavy metal bearing entrained furnace particles, comprising the steps of: (a) treating the mixture with lime at a pH of about 11.0 to about 12.5 at a temperature above 60° C. whereby the phosphorus is converted in part into salts of phosphorus acids and in part to phosphine while the said heavy metal containing particles are rendered non-leachable, the amount of lime being sufficient to maintain the said pH during and after the treatment; (b) collecting the phosphine from (a); and (c) removing the water from the treated aqueous mixture of (a) to produce clarified water and non-leachable solids having a phosphorus content below burning levels.

DETAILED DESCRIPTION OF THE INVENTION

The aqueous phosphorus wastes of the invention are by-products arising from the manufacture of phosphorus by the electric furnace process. They are formed in the plant or wherever phosphorus comes in contact with water or is stored under water.

The phosphorus concentration of the aqueous wastes can vary over wide limits depending on their point of origin. As previously noted, one source of the aqueous wastes results from slurrying the entrained solids collected by the electrostatic precipitator and typically contains a phosphorus content of from about 0.1% to about 1% while the solids content typically runs from about 5% to about 20%. Leachable metals occurring in the entrained furnace solids include arsenic (As), barium (Ba), cadmium (Cd), chromium (Cr), lead (Pb), mercury (Hg), selenium (Se) and silver (Ag). Leachability limits for these metals have been established by the EPA.

So far as can be ascertained, there is essentially no upper limit to the levels of phosphorus and heavy metal in the aqueous wastes which can be rendered nonleachable by the process of the invention and the phosphorus recovered. This finding is of great economic significance since dilute aqueous wastes can be dewatered thereby raising the concentration of components while reducing the volume of liquid to be handled and treated.

The amount of water to be removed will depend on the desired degree of concentration of the waste components. Generally speaking, an entrained solids content by weight of from about 10% to about 20% affords a slurry which can be conveniently pumped through feed and supply lines. More concentrated slurries can be readily produced but they may be too thick to be easily handled and conveyed by pumping. Of course, sufficient water must be retained with the slurry to prevent the phosphorus from being exposed to atmospheric oxygen and the risk of spontaneous ignition of the phosphorus.

Clarified water from the dewatering is sufficiently pure for release into the environment. Usually however, the clarified water is recycled for reuse in the phosphorus plant.

Dewatering may be accomplished by various known means, including settling, filtration, or clarification.

The dewatered slurry, typically containing about 15% to 20% solids and 1% to 10% phosphorus is contacted with hydrated lime in an amount sufficient to react with the free phosphorus to form phosphine and to render the heavy metals in the solids non-leachable when covered over with soil or placed in a landfill.

In general, the criteria aforesaid can be realized by employing a lime to $P_4$ ratio of about 2.0 to about 6.4 while maintaining a pH in the range of about 11.0 to about 12.5. Lower ratios may not reduce the $P_4$ to non-combustible levels in the final residues within a reasonable time. Higher ratios, although effective, offer no advantage. While the lime to $P_4$ ratio can vary from about 2.0 to about 6.4, a ratio of about 3 to 4 normally assures the requisite stoichiometry and economy of material and thus represents a preferred ratio.

In the treatment of aqueous phosphorus by the herein process, several chemical reactions take place. Although the chemistry is not completely understood, a general approximation is that about one third ($\frac{1}{3}$) of the elemental phosphorus is converted to calcium hypophosphite, about $\frac{1}{3}$ to calcium phosphite and about $\frac{1}{3}$ to phosphine containing gas. After placement in a landfill, the phosphite and hypophosphite are slowly transformed into insoluble calcium phosphates. The heavy metal components in the entrained solids are converted by the lime treatment into non-leachable entities such as phosphates, sulfides and aluminosilicates.

The phosphine can be collected as a product per se or combusted in a natural gas burner to produce phosphorus oxides preferably $P_2O_5$. The $P_2O_5$ can be reacted with water to produce phosphoric acid. Except for the presence of arsenic, which is readily removed by sulfiding, the acid is of semiconductor grade quality.

The reaction of the phosphorus wastes with excess lime is carried out at temperatures in the range of about 60° C. up to about the boiling point of the aqueous medium at normal atmospheric pressure, preferably about 85° C.

At higher temperatures much above 85° C., the volatilization and condensation of elemental phosphorus tend to give plugging problems in equipment and off-gas transfer lines. This can be prevented by means of heated jackets thereby permitting the lime treatment to be performed at higher temperatures with consequent shorter reaction times.

At temperatures below about 55° C. reaction rates become too slow. In general, the temperatures will range from about 60° C. to about 85° C. at atmospheric pressure.

After the reaction is completed, the mixture is dewatered to produce concentrated solids which are non-leachable when placed in a landfill. Clarified water from the dewatering can be recycled for in plant use or released into the environment.

Some elemental phosphorus may remain in the treated wastes but the amount is quite small, typically much less than 0.1% and far below the level where burning or spontaneous ignition of the dried waste would occur.

When employed in the above specified amounts, sufficient lime will be left in the treated wastes to gradually transform the residual phosphorus into phosphorus salts while maintaining the disposal site in an alkaline state thereby ensuring that the non-leachability of the heavy metals is preserved.

Surprisingly, the action of lime on the herein aqueous phosphorus wastes produces a greater quantity of phosphine than when an aqueous suspension containing a like amount of phosphorus alone is treated under identical conditions. Apparently, the presence of the entrained furnace materials accelerates the evolution of phosphine from the aqueous wastes. Such unexpected behavior is a decided advantage in the practical application of the process of the invention.

Reference is now made to the following examples for purposes of illustrating the invention.

EXAMPLE 1

Into a 1 liter baffled glass reactor was placed 280 g of aqueous phosphorus wastes from an electric phosphorus-plant and containing 6.7% of elemental phosphorus and 37.1% of suspended furnace solids; 420 g of distilled water and 68 g of hydrated lime (95% purity). The lime to phosphorus ratio was 3 to 4.

The reactor contents were heated for three hours at 65° C. after which the elemental phosphorus concentration was 0.04%. After cooling to room temperature, the pH of the mixture was measured at 12.4.

The reaction mixture was subjected to the EPA approved Toxic Characteristic Leachability Test (TCLP) to determine metal leachability according to CFR of Jun. 29, 1990. In this test, aqueous wastes containing >0.05 solids and that are not exceedingly alkaline, are extracted at a pH of 4.93 with acetate-buffered extractant solution at a 20:1 weight ratio of extractant-to-waste. Agitation of the mixture is continued for 18 hours at 23° C., followed by filtration and analysis of the filtrate for 8 metals. Where the solids content is <0.05%, the aqueous wastes are filtered and the filtrate acidified and analyzed directly for the 8 metals.

For further details on the TCLP, reference is made to the aforecited CFR of Jun. 29, 1990, the description of which is incorporated in the herein specification.

The results of the heavy metal tests as per TCLP are set forth below in which the metal assays are in parts per million (ppm).

| Metal | Total Original Metal Level | Leachability After Lime Treatment | Metal Leachability EPA Limit |
| --- | --- | --- | --- |
| As | 19 | <0.02 | 5 |
| Ba | 165 | 8.9 | 100 |
| Cd | 5800 | 0.09 | 1.0 |
| Cr | 219 | 0.04 | 5.0 |
| Pb | 431 | <0.01 | 5.0 |
| Hg | 9.0 | <0.001 | 0.2 |
| Se | 1.2 | 0.10 | 1.0 |
| Ag | 761 | 0.03 | 5.0 |

As will be observed by the process of the invention, the metals are reduced below the EPA limits while the phosphorus concentration of 0.04% is far below burning levels.

EXAMPLE 2

To 101 g of aqueous phosphorus wastes containing 6.5% elemental phosphorus and 30.1% solids was added 254 g of distilled water and 23 g of hydrated lime and mixture heated two hours at 66° C. following the procedure of Example 1. A final pH of 12.4 was measured.

The metal leachability of the treated aqueous phosphorus wastes was as follows:

| Metal | Total Original Metal Level | Leachability After Lime Treatment |
| --- | --- | --- |
| As | 21 | <0.005 |
| Ba |  | 0.1 |
| Cd | 10,393 | 0.07 |
| Cr | 472 | 0.01 |
| Se | 1.2 | <0.005 |
| Pb |  | <0.1 |
| Hg |  | <0.008 |
| Ag |  | 0.01 |

The phosphorus content of the dried wastes was reduced to below burning levels.

EXAMPLE 3

To 272 g of aqueous phosphorus waste containing 8.7% phosphorus and 36.7% solids were added 420 g of distilled water and 50 g of hydrated lime (95% Ca(OH)$_2$) and the mixture heated at 99° C. for one hour. A final pH of 12.2 was measured.

The metal leachability of the treated aqueous phosphorus wastes was as follows:

| Metal | Total Original Metal Level | Leachability After Lime Treatment |
| --- | --- | --- |
| As | 7 | <0.003 |
| Ba |  | 0.11 |
| Cd | 3923 | <0.03 |
| Cr | 217 | <0.03 |
| Se | 0.4 | <0.005 |
| Pb |  | <0.02 |
| Hg |  | <0.004 |
| Ag |  | <0.03 |

The phosphorus content of the dried wastes was below burning levels.

Example A

The purpose of this example is to compare the results of treating specimens of an aqueous phosphorus waste and an aqueous suspension of phosphorus with lime.

Into a baffled glass laboratory reactor was placed 5 g of distilled water and 8.76 g of distilled phosphorus. The mixture was heated to 97° C. with agitation and then 32 g of hydrated lime in 75 g of distilled water introduced. Heating was continued as above while maintaining vigorous stirring in order to form droplets of molten phosphorus.

During the course of an hour, 1510 ml of phosphine containing gas evolved.

A similar reaction was carried out except the aqueous suspension of pure phosphorus was replaced with 282 g of aqueous phosphorus waste containing 24.5 g of elemental phosphorus which was diluted with 303 g of distilled water.

The reactor was heated to 100° C. with agitation at which point a lime slurry of 50 g lime and 117 g of distilled water was introduced into the reactor and heating continued for one hour. During this period, there was evolved 6117 ml of phosphine containing gas. This compares with 4223 ml which was obtained with the pure aqueous phosphorus suspension after allowance for the difference in phosphorus content.

This example clearly demonstrates the unexpectedly higher reactivity toward lime of the phosphorus in the aqueous wastes vis-a-vis a water suspension of pure phosphorus.

We claim:

1. An environmentally compatible process for the disposal of phosphorus wastes generated in the electric furnace manufacture of elemental phosphorus, the wastes being an aqueous mixture of phosphorus and heavy metal bearing entrained furnace particles, comprising the steps of: (a) treating the mixture with lime at a pH of about 11.0 to about 12.5 at a temperature above 60° C. whereby the phosphorus is converted in part into salts of phosphorus acids and in part to phosphine while the said heavy metal containing particles are rendered non-leachable, the amount of lime being sufficient to maintain the said pH during and after the treatment; (b) collecting the phosphine from (a); and (c) removing the water from the treated aqueous mixture of (a) to produce clarified water and non-leachable solids having a phosphorus content below burning levels.

2. An environmentally compatible process for the disposal of phosphorus wastes generated in the electric furnace manufacture of elemental phosphorus, the wastes being an aqueous mixture of phosphorus and heavy metal bearing entrained furnace particles comprising the steps of: (a) treating the mixture with lime at a pH of about 11.0 to about 12.5 at a temperature above about 60° C. whereby the phosphorus is converted in part into salts of phosphorus acids and in part to phosphine while the said heavy metal containing particles are rendered non-leachable, the amount of lime being sufficient to maintain the said pH during and after the treatment; (b) burning the phosphine to produce highly pure phosphorus oxides and (c) removing the water from the treated aqueous mixture of (a) to produce clarified water and non-leachable solids having a phosphorus content below burning levels.

3. The process of claim 2 wherein the phosphorus oxides are reacted with water to provide phosphoric acid.

4. The process of claim 1 wherein the lime to phosphorus ratio ranges from about 2.0 to about 6.4.

5. The process of claim 4 wherein the lime to phosphorus ratio ranges from about 3 to about 4.

6. The process of claim 1 wherein the solids content is from about 10% to about 20%.

7. The process of claim 1 wherein the temperature is from about 60° C. to about 85° C.

* * * * *